Jan. 30, 1923. 1,443,869
G. J. CHILDS.
LOCK NUT.
FILED SEPT. 30, 1921.
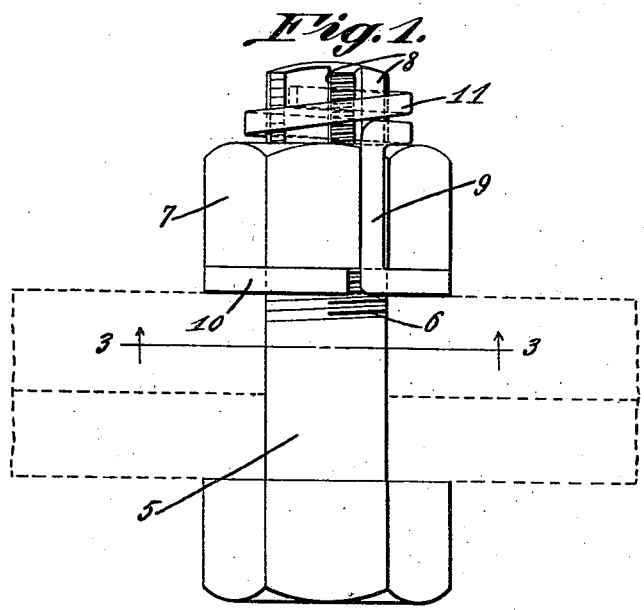
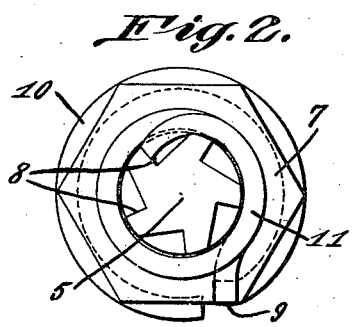
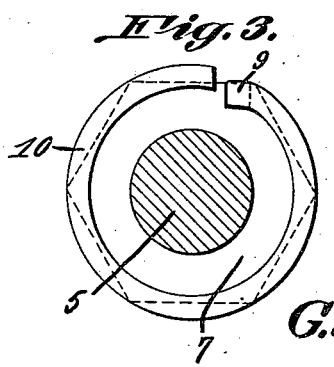
G. J. Childs, Inventor
By C. A. Snow & Co.
Attorney Patented Jan. 30, 1923.

1,443,869

UNITED STATES PATENT OFFICE.

GEORGE J. CHILDS, OF ALLENTOWN, PENNSYLVANIA, ASSIGNOR OF ONE-FOURTH TO WILLIAM P. MOYER, ONE-FOURTH TO FRED A. BOGH, AND ONE-FOURTH TO JOHN H. HOLZINGER, ALL OF ALLENTOWN, PENNSYLVANIA.

LOCK NUT.

Application filed September 30, 1921. Serial No. 504,357.

*To all whom it may concern:*

Be it known that I, GEORGE J. CHILDS, a citizen of the United States, residing at Allentown, in the county of Lehigh and State of Pennsylvania, have invented a new and useful Lock Nut, of which the following is a specification.

This invention relates to nut and bolt locks, the primary object of the invention being to provide a novel form of nut lock, capable of locking a nut in various positions along a bolt.

Another object of the invention is to provide removable means to permit the bolt and nut to be connected, the bolt having notches formed in the periphery thereof to accommodate the locking means.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a bolt and nut constructed in accordance with the present invention.

Figure 2 is a plan view of the same.

Figure 3 is a sectional view taken on line 3—3 of Figure 1.

Referring to the drawing in detail, the reference character 5 designates a bolt which is provided with the usual threaded portion 6 designed to accommodate the nut 7.

The bolt is provided with longitudinal grooves providing shoulders 8, which shoulders provide abutments for the upper end of the locking element 9, which locking element also embodies a circular section 10 constituting a washer. The nut 7 is formed with a vertical groove to accommodate a portion of the locking element, whereby movement of the nut will be prevented.

This locking element is in the form of a length of metal substantially square in cross section, the lower portion, as before stated being formed into the washer portion 10, while the upper portion thereof is coiled as at 11, the free end thereof adapted to engage the shoulders 8, to restrict movement of the nut 7 in one direction.

From the foregoing it will be seen that a nut supplied with a locking element as shown and described, may be rotated in one direction, but will be prevented from rotating in the opposite direction, by the free end of the section 11 contacting with the shoulders 8.

Having thus described the invention, what is claimed as new is:—

In a nut and bolt lock, a bolt having longitudinal grooves formed in the threaded extremity thereof, each of the grooves including an angular wall and a relatively straight wall, a nut movable on the threaded portion of the bolt, a locking element including a length of resilient metal square in cross section and having a squared end portion, one extremity of the length of metal being formed into a washer and adapted to fit under the nut, the opposite end of the locking element being coiled around the bolt above the nut and having its squared end portion engaging the straight wall of one of the grooves to exert a pressure on the coiled portion in a circular plane throughout the length of the coiled portion, upon reverse movement of the nut, and the intermediate portion of the locking element lying in close engagement with one of the side faces of the nut to hold the nut against movement.

In testimony that I claim the foregoing as my own, I have hereto affixed my signature in the presence of two witnesses.

GEORGE J. CHILDS.

Witnesses:
 ROSCOE G. LERCH,
 JOHN H. TONER.